May 21, 1935.  G. A. BARDET ET AL  2,002,105
KEY ATTACHING MECHANISM
Filed March 27, 1933
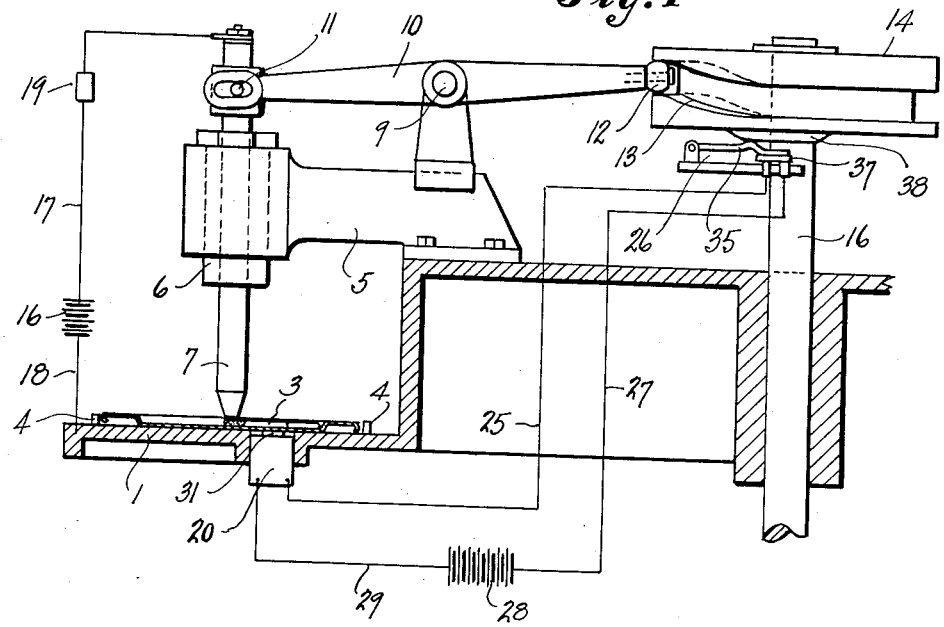
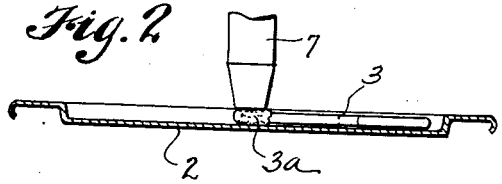
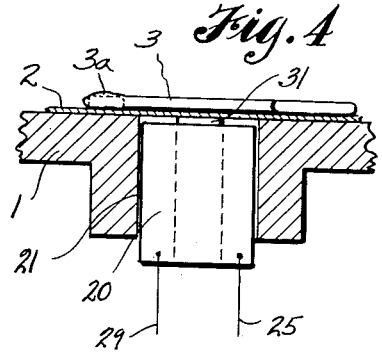
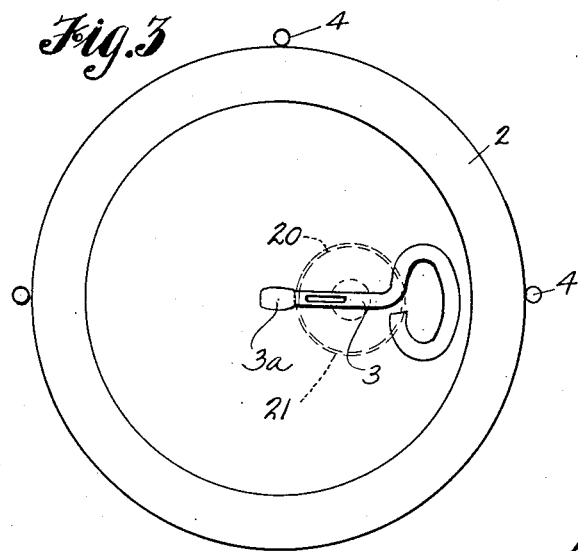
GEO. A. BARDET
GEO. V. BARDET
INVENTOR
BY Cook & Robinson
ATTORNEY Patented May 21, 1935

2,002,105

UNITED STATES PATENT OFFICE 2,002,105

KEY ATTACHING MECHANISM

George A. Bardet and George V. Bardet, Berkeley, Calif., assignors to M. J. B. Company, a corporation of Delaware Application March 27, 1933, Serial No. 663,026

1 Claim. (Cl. 219—12)

This invention relates to improvements in means for attaching keys to can ends, or the like, and it has reference more particularly to machines or devices whereby solder bearing, or solder tipped keys, may be soldered to can ends thus to retain a key with each can until it is desired that it be used in removing the tearing strip from the can.

The present invention is applicable to machines of various kinds having the general purpose of that disclosed in United States Patent No. 1,743,519 issued March 10, 1928, to George A. Bardet and George V. Bardet.

Explanatory to the present invention it will here be stated that it is now common practice to attach solder tipped or solder bearing keys to can ends. A "solder tipped" key is one which, prior to its application to the can, has had an end portion coated by dipping it in molten solder. The usual form of "solder bearing" key is one provided with a hole through one end in which a small amount of solder is contained. In the attachment of either of these kinds of keys, as now generally carried on, the key is first located on the can end, then the end is delivered into a machine upon a suitable support, or base. Then, by use of certain devices, an electric current is passed through the solder bearing or solder tipped part of the key to fuse the solder for attachment of the key to the can end.

It is very desirable, in the attaching of keys in this way, that the key be held firmly against the end during the solder cooling period. In the machine of the patent to Bardet, et al., above referred to, a lever is associated with each of the soldering stations of the machine, and these levers are actuated in such manner as to press down on the keys to hold them tightly against the can ends during the solder fusing period and for a short time thereafter, during cooling of the solder. The levers retain the keys in place and also prevent any possible upward flexing of the can end, which might displace the key.

The principal object of the present invention is to simplify the construction of the usual soldering machine by the provision of magnetic means in connection with the soldering devices for holding the keys firmly in place on the can ends during the solder fusing and cooling periods, thereby to eliminate the necessity of the levers or similar mechanically actuated means for this purpose.

More specifically stated, the present invention resides in the provision of an electromagnet disposed beneath the can end support and which is operable to magnetically hold the key solidly against the end after the solder has been melted by the flow of current therethrough and during the period required for it to set after the circuit has been opened. In a co-pending application Serial No. 663,027 we have provided for attaching keys by passing an electric current through that portion of the can on which the key is disposed to cause the end to be sufficiently heated for melting the solder to attach the key.

Other objects of the invention reside in the various details of construction and in the combination of parts and mode of operation of the device, as will hereinafter be described.

In accomplishing these and other objects of the invention, I have provided the improved details of construction, the preferred forms of which are illustrated in the accompanying drawing, wherein—

Fig. 1 is a sectional view of a key attaching means embodying the present invention; the circuit connections being diagrammatically illustrated.

Fig. 2 is an enlarged, sectional view through the can end and key.

Fig. 3 is a section taken on line 3—3 in Fig. 1.

Fig. 4 is an enlarged, sectional view through the can end support particularly illustrating the location of the electromagnet.

Referring more in detail to the drawing—

1 designates what may be a metallic base or support on which a can end 2, with a solder tipped key 3 located thereon, may be placed for the soldering operation. To definitely locate the can end with respect to the soldering element, later described, stops or guides, as at 4, may be provided on the base against which the can end may be disposed.

Fixed to the base member 1 is a bracket 5 having an end portion overlying the can end and containing an insulating bushing 6 in which an electrically conductive rod or contact 7 is reciprocally contained for movement toward and from the can end. The lower end of this contact is alined vertically above the solder tipped portion 3a of the key 3.

Pivotally mounted upon the bracket 5, as at 9, is a lever 10, one end of which has a pin and slot connection 11 with the upper end portion of the contact 7. At its opposite end the lever has a cam follower 12 contained within the cam slot 13 of a cam wheel 14 fixed upon a shaft 16. The base 1 and the cam wheel are rotatable relative to each other. Therefore, with each relative rotation, the lever 10 will be actuated by reason of the design of the cam slot, to reciprocally move the contact to bring its lower end portion against and then away from the solder tipped portion of the key. As illustrated best in Fig. 1, there is a source of electricity designated at 16, one side of which is connected by a wire 17 with the upper end of the contact 7 and the other side is connected by a wire 18 with the base 1. Therefore, when the contact 7 engages with the key the circuit will be closed through the key, can end and base 1, and the flow of current through the solder bearing portion of the key will operate to melt the solder for attachment of the key. If it should be more desirable, a switch, as at 19, might be included in the circuit, and operable by the mechanism for an automatic closing and opening of the circuit at proper times.

In order that the key 3 may be held firmly in place against the can end, especially during the solder cooling period, I have provided an electromagnet 20. This is supported within an opening 21 of the base, below the can end and preferably directly below the shank portion of the key. This electromagnet has a circuit connection 25 from one side thereof to one side of a switch 26 and from the other side of the switch a connection 27 leads to one side of a source of electricity 28. The other side of the electromagnet has a circuit connection 29 with the other side of the source of electricity 28; the arrangement being such that when the circuit is closed, the magnet will be energized to draw the key 3 tightly against the can end. The core 31 of the magnet, as illustrated best in Fig. 4, is arranged to engage with the underside of the can end as a sort of support for the end.

As illustrated in Fig. 1, the switch 26 is located adjacent the cam wheel 14 and it comprises a spring pressed switch lever 35 with an armature 37 at its end. Normally, the switch is open but the switch lever is disposed in position to be engaged by a cam 38 on the wheel 14, which, on each rotation of the cam, moves the lever to cause the armature to close the connection between wires 25 and 27, thus to close the circuit during the period that the contact 7 is in lowered position, and for a short time after the contact has been raised. Thus, during the solder fusing and cooling period, the magnet will be energized.

With the device so constructed, it is readily apparent that by provision of an electromagnet of sufficient strength, the key will be held firmly in place, and also that the can end may be held against flexing during the solder cooling period so that a firm and secure connection may be provided between the key and can on cooling of the solder.

It is to be understood that the means which I have illustrated for actuating the contacts, and for closing the circuit, are only illustrative of one of many devices which may be used for this purpose, and therefore, it is not desired that the claim, appended hereto, shall be confined to that particular type of means, but that they shall apply broadly to uses of a magnet for the purpose of holding a key in place for its attachment by solder.

The present device may also be used with satisfaction where the key is spot-welded to the can end as a means of holding the key in place prior to and during the welding operation, which would be carried on in substantially the same manner as the soldering operation.

Having thus described my invention, what I claim as new therein and desire to secure by Letters Patent is—

A key attaching mechanism comprising a support for a can end having a solder bearing key loosely located thereon, an electric contact, means for moving the contact from a raised position to a lowered position for momentarily contacting and closing an electric circuit through the key to fuse the solder for attaching the key to the can end and for exerting pressure against the key to press it tightly against the can end, and a magnet disposed below the support and adapted to be energized to draw the key against the can end and the end against the support to hold the end and key from movement during the solder setting period after the contact is lifted.

GEORGE A. BARDET.
GEORGE V. BARDET.